US008321319B1

(12) United States Patent
Grossblatt et al.

(10) Patent No.: US 8,321,319 B1
(45) Date of Patent: Nov. 27, 2012

(54) RENTAL PROPERTY INVESTMENT CALCULATOR

(75) Inventors: Lesley K. Grossblatt, San Francisco, CA (US); Lucinda Kathryn Foss, San Francisco, CA (US); Miriam Nga-Shun Vu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 627 days.

(21) Appl. No.: 12/257,284

(22) Filed: Oct. 23, 2008

(51) Int. Cl.
*G06Q 40/00* (2012.01)
(52) U.S. Cl. .......... 705/36 R; 705/1; 705/35; 705/36 T; 705/37; 705/38; 707/9; 707/10
(58) Field of Classification Search ............... 705/1, 35, 705/36 R, 36 T, 37, 38; 707/9, 10
See application file for complete search history.

(56) References Cited

U.S. PATENT DOCUMENTS

| 2001/0037280 A1* | 11/2001 | Ingraham et al. ............... 705/37 |
| 2001/0044764 A1* | 11/2001 | Arnold ........................... 705/35 |
| 2003/0041063 A1* | 2/2003 | Brady ............................ 707/10 |
| 2003/0046205 A1* | 3/2003 | Brier et al. ..................... 705/35 |
| 2003/0177120 A1* | 9/2003 | Stodolsky ....................... 707/9 |
| 2003/0200102 A1* | 10/2003 | Tao ................................ 705/1 |
| 2003/0225643 A1* | 12/2003 | Kakoschke .................... 705/35 |
| 2004/0064402 A1* | 4/2004 | Dreyer et al. .................. 705/38 |
| 2004/0220823 A1* | 11/2004 | Brush et al. .................... 705/1 |
| 2005/0080699 A1* | 4/2005 | Snelling ......................... 705/35 |
| 2007/0271197 A1* | 11/2007 | Law .............................. 705/36 R |
| 2008/0306880 A1* | 12/2008 | Legatz .......................... 705/36 R |
| 2009/0018974 A1* | 1/2009 | McCracken et al. ......... 705/36 T |
| 2009/0099975 A1* | 4/2009 | Torre et al. ................... 705/36 R |

OTHER PUBLICATIONS

"Rent Control" article by Block, Walter, copyright 2002, from 'The Concise Encyclopedia of Economics', 7 pages.*
"Rent Control" article by Block, Walter, copyright 2008, from 'The Concise Encyclopedia of Economics', 8 pages.*

* cited by examiner

*Primary Examiner* — James Trammell
*Assistant Examiner* — Sanjeev Malhotra
(74) *Attorney, Agent, or Firm* — Osha Liang LLP

(57) ABSTRACT

The invention relates to a method for analyzing an investment in a rental property. The method steps include obtaining identification information of the rental property, wherein identification information identifies the rental property to an information source, submitting a request to the information source based on identification information, receiving property information from the information source based on the request, obtaining an investment parameter from an investor of the investment in the rental property, analyzing the investment in the rental property based on the investment parameter and property information to generate an analysis result, adjusting the investment parameter to optimize the analysis result resulting in an optimized analysis result, and generating a report based on the optimized analysis result.

12 Claims, 4 Drawing Sheets

RENTAL PROPERTY INVESTMENT CALCULATOR

BACKGROUND

Rental property investment involves the purchase, ownership, management, rental and/or sale of real estate rental property (or investment property) for profit. In addition, improvement of rental property (i.e., rental property development) is often included as part of an overall investment strategy. In general, real estate is an asset form with limited liquidity and considered to be capital intensive and highly cash flow dependent. For example, the investment capital may be raised through investor equity or mortgage leverage while the cash flow includes rental income and management expense. If these factors are not well understood and managed by the investor, real estate property can become a risky investment. The primary cause of real estate investment failure is that the investor enters into unsustainable negative cash flow resulting in insolvency or property sale at a loss.

Generally speaking, individual properties are unique and not directly interchangeable, which presents a challenge to an investor seeking to evaluate prices and investment opportunities. For this reason, identifying properties for investment can involve substantial work, which increases transactional risk but also provides opportunities for obtaining properties at bargain prices. Real estate investors typically use a variety of appraisal techniques to determine the value of properties prior to purchase. Typical sources of investment properties available for purchase includes market listings (e.g., a multiple listing service), public auction (e.g., foreclosure sales, estate sales, etc.), private sales, etc. Once an investment property is identified and preliminary due diligence (e.g., investigation and verification of the condition and status of the property) completed, the investor typically negotiates a purchase price and sale terms with the seller before executing a contract for sale.

A substantial portion of the purchase price is typically financed using, for example a mortgage loan (or debt) collateralized by the property itself. The portion of the purchase price financed by debt is referred to as leverage. The amount financed by the investor's own capital, through cash or other asset transfers, is referred to as equity. The ratio of leverage to equity (or loan to value (LTV)) is one numerical measure of the risk in financing an investment property purchase. Investors usually seek to decrease their equity requirements and increase their leverage to maximize return on investment (ROI). Lenders and other financial institutions usually require minimum equity or maximum LTV (e.g., 80 percent) for financing real estate investments. Investors seeking low equity investment strategy may explore additional financing arrangements such as seller financing, seller subordination, private equity sources, etc. Investors with large enough capital reserves may explore investment strategies to allow 100 percent equity in investment properties, which minimizes the leverage risk but also limits potential ROI.

Net operating income (NOI) is the sum of all positive cash flows from rents and other sources of ordinary income generated by an investment property (i.e., asset) minus the sum of ongoing expenses, such as maintenance, utilities, fees, taxes, debt service payments (i.e., carry cost of the investment), etc. The ratio of NOI to the asset purchase price, expressed as a percentage, is called the capitalization rate, and is a common measure of the performance of an investment property. Other conventional measure of investment performance includes return on investment, return on asset, return on equity, return on capital, etc.

Tax shelter offsets occur in several different ways, such as depreciation (which may sometimes be accelerated), tax credits, and carryover losses (which reduce tax liability charged against income from other sources). Some tax shelter benefits depends on tax profile (e.g., tax bracket, active/passive property management status, etc.) of the investor according to the laws governing tax liability in the jurisdiction where the property is located.

Equity build-up in an investment property may be a result of principal reduction portion of debt service payments or increase in market value of the asset over time (i.e., capital appreciation). Capital appreciation can be unpredictable unless planned as part of a development and improvement strategy.

SUMMARY

In general, in one aspect, the invention relates to a method for analyzing an investment in a rental property. The method steps include obtaining identification information of the rental property, wherein identification information identifies the rental property to an information source, submitting a request to the information source based on identification information, receiving property information from the information source based on the request, obtaining an investment parameter from an investor of the investment in the rental property, analyzing the investment in the rental property based on the investment parameter and property information to generate an analysis result, adjusting the investment parameter to optimize the analysis result resulting in an optimized analysis result, and generating a report based on the optimized analysis result.

In general, in one aspect, the invention relates to a method for analyzing an investment in a rental property. The method steps include establishing a communication channel with an information source for requesting and receiving rental property information, wherein the communication channel is established based on a first agreement, providing a rental property investment calculator to an investor of the investment for analyzing investment performance based on rental property information and investment parameters, wherein the rental property investment calculator is provided based on a second agreement, receiving the investment parameters from the investor, requesting and receiving rental property information using the communication channel, analyzing the investment performance using the rental property investment calculator based on property information and the investment parameters to generate an analysis result, and providing the analysis result to the investor.

In general, in one aspect, the invention relates to a system for performing operations for analyzing an investment in a rental property. The system includes an information source, and a processor and memory comprising instructions that when executed by the processor comprise functionality to obtain identification information of the rental property, wherein identification information identifies the rental property to the information source, submit a request to the information source based on identification information, receive property information from the information source based on the request, obtain an investment parameter from an investor of the investment in the rental property, analyze the investment in the rental property based on the investment parameter and property information to generate an analysis result, adjust the investment parameter to optimize the analysis result resulting in an optimized analysis result, and generate a report based on the optimized analysis result.

In general, in one aspect, the invention relates to a system for performing operations for analyzing an investment in a rental property. The system includes a processor and memory, an information source, a communication channel established with the information source for requesting and receiving rental property information, wherein the communication channel is established based on a first agreement, and a rental property investment calculator provided to an investor of the investment based on a second agreement, wherein memory comprises instructions when executed by the processor comprise functionality to receive investment parameters from the investor, request and receive rental property information using the communication channel, analyze investment performance based on property information and the investment parameters to generate an analysis result, and present the analysis result to the investor.

Other aspects of the invention will be apparent from the following description and the appended claims.

DETAILED DESCRIPTION

Figure 1:
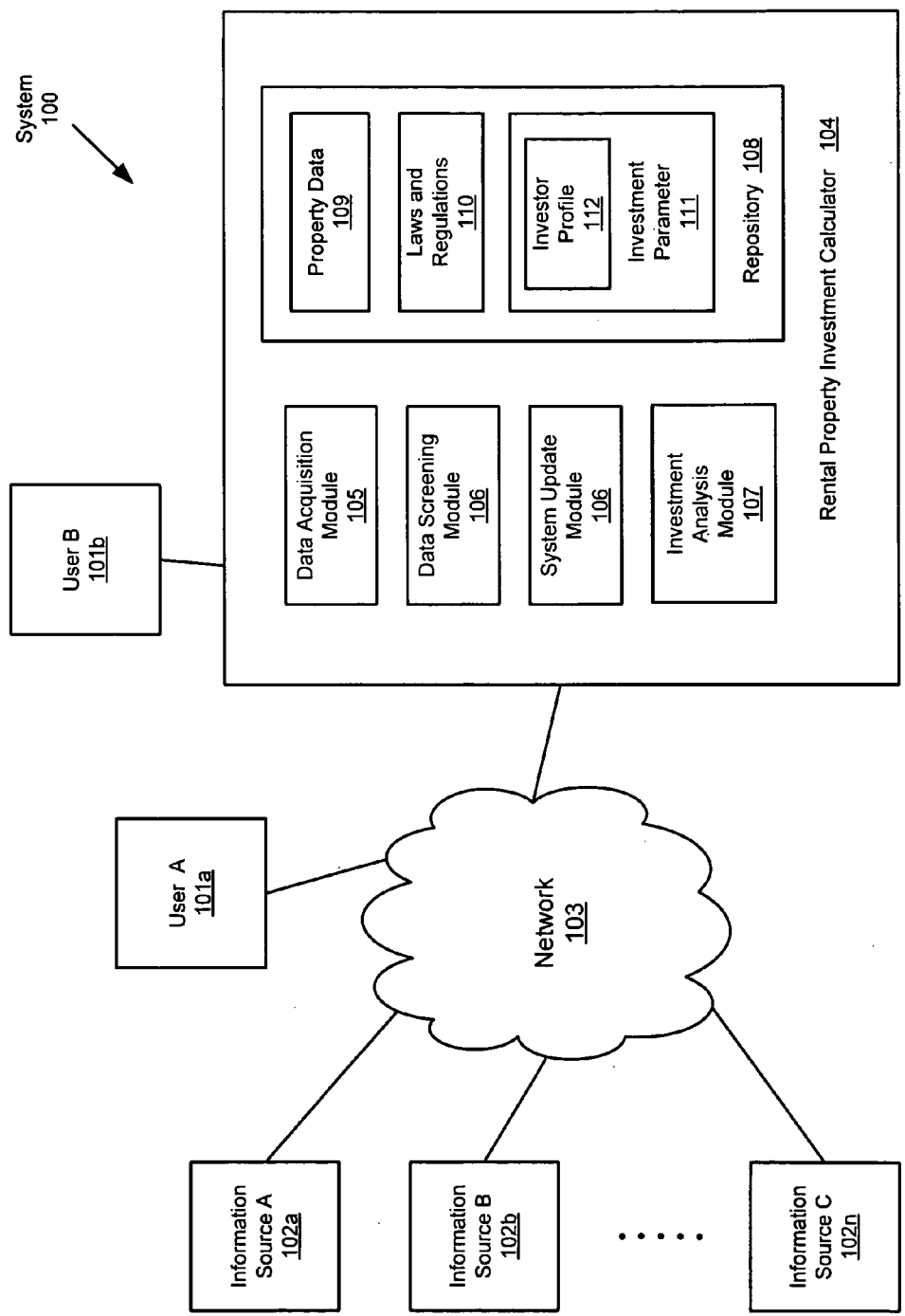
FIG. 1 depict schematic block diagrams of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to analyze and optimize rental property investments.

FIG. 1 depicts a schematic block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes user (101a), user (101b), information source (102a), information source (102b), information source (102n), rental property investment calculator (104) and network (103). The rental property investment calculator (104) further includes data acquisition module (105), data screening module (106), system update module (106), investment analysis module (107), and repository (108). Furthermore, property data (109), laws and regulations (110), investment information (111) and investor profile (112) are shown to be stored in the repository (108). Although specific numbers of each component are shown in FIG. 1, any number of each of these components may exist in the system (100) without deviating from the spirit of the invention.

In one or more embodiments of the invention, one or more users (e.g., (101a) or (101b)) may use one or more rental property investment calculator (e.g., (104)) to assist in accessing informational sources (e.g., (102a)-(102n)) for analyzing a rental property investment. In one or more embodiments of the invention, user (102a) may access the rental property investment calculator (104) via network (103). In one or more embodiments of the invention, user (102b) may access the rental property investment calculator (104) directly. In one or more embodiments of the invention, the rental property investment calculator (104) may be integrated in a financial application (e.g., financial management software, accounting software, etc.) used by user (101a) or user (101b). In one example, the financial application may be hosted by an application service provider (not shown) where the rental property investment calculator (104) may be an added feature, which may be accessed by user (101a) via the network (103). In another example, the financial application may be a stand alone application executing on a computing device such as computer, PDA, smart phone, etc. (not shown) used by the user (101b). In one or more embodiments of the invention, the rental property investment calculator (104) may be integrated in a third party application such as real estate service provider, information aggregating website, etc.

In one or more embodiments of the invention, the information sources (102a-102n) may include real estate association, real estate listing service, rental property management association, rental property owner association, real estate legal service, government organization, and third party information aggregation service. Generally speaking, property information may be requested and obtained from these information sources using any suitable communications media, such as in person, via voice communications over the telephone, via the completion of an application form on paper, which may be completed in person or mailed to the information sources, or by completion of a form on a computer terminal connected to the Internet or other computer networks. In one or more embodiments of the invention, the request and transmission of property information may be formatted for communication to these information sources via a formatted electronic message (not shown), which may be communicated via network (103) including a variety of channels, such as Internet, e-mail, modem, microwave signal, dial-up electronic connections, satellite communications links, or other electronic communication channels.

In one or more embodiments of the invention, the data acquisition module (105) is configured for importing, downloading, or otherwise obtaining property information (e.g., property data (109), laws and regulations (110), etc.) into the rental property investment calculator (104). Such property information may be imported, downloaded, or otherwise obtained based on request or automatically on periodic basis. In one or more embodiments of the invention, such vendor information may be imported, downloaded, or otherwise obtained from any of the information sources (102a-102n). In one or more embodiments of the invention, the data acquisition module (105) may include a proprietary interface for a specific information source (e.g., a particular one of the information sources (102a-102n)). In one or more embodiments of the invention, the data acquisition module (105) may include a standard interface compatible with multiple information sources (e.g., any of the information sources (102a-102n)). In one or more embodiments of the invention, the data acquisition module (105) may include an open standard available to any developer. In one or more embodiments of the invention, the data acquisition module (105) may include an interface maintained based on agreements among participating information sources (e.g., any of the information sources (102a-102n)) and a provider of the rental property investment calculator (104).

In one or more embodiments of the invention, the system functionality compatible to various information sources (e.g., any of the information sources (102a-102n)) supported or to be established by the rental property investment calculator (104) may be updated by the system update module (106). In one or more embodiments of the invention, the system functionality may be updated based on request or automatically on periodic basis.

In one or more embodiments of the invention, a rental property (not shown) may be identified to the information sources (102a-102n) based on identification information, such as property address (e.g., street address), recording map reference designator (e.g., parcel number, lot number, block number, etc.), or other conventional property identification information. In one or more embodiments of the invention, requested property information may be further identified or specified by property type, such as single unit property (e.g., single family residential), multiple unit property (e.g., duplex, tri-plex, etc.), common interest property (e.g., condominium, co-op, TIC, etc.), commercial rental property, etc.

In one or more embodiments of the invention, property information requested and obtained from the information sources (102a-102n) may be screened using the data screening module (106) to assure received data to be reliable and up to date.

In one or more embodiments of the invention, property data (109) may include purchase price, rental profile, property tax, etc. where purchase price and/or rental profile may include historical data of the rental property, historical data of local comparable properties, and current market data of the local comparable properties. For example, the rental profile may include rent, vacancy rate, and rental expense, etc. In addition, laws and regulations (110) may include a rent control rule.

In one or more embodiments of the invention, investment parameter (111) represents investment consideration of an investor (e.g., user (101a) or (101b)) of the investment in the rental property and may include offering price, down payment, mortgage information, and investor profile. For example, mortgage information may include mortgage amount, interest rate, interest rate adjustment period, amortization period, etc. while investor profile may include personal tax bracket, income deduction summary, rental property active/passive management status, etc.

In one or more embodiments of the invention, investment analysis module (107) is configured to analyze investment performance based on property data (109), laws and regulations (110), and investment parameter (111). For example, investment performance may be analyzed based on capitalization rate, return on investment, return on asset, return on equity, return on capital, and/or other conventional investment performance measures. Generally speaking, conventional methods for calculating these various rental property investment performance measures may be used by the investment analysis module (107) in analyzing the investment performance.

In one or more embodiments of the invention, investment parameter (111) may be adjusted by the investor based on the initial analysis result, for example to optimize the final analysis result. In one or more embodiments of the invention, investment parameter may further include an investment capital, which may be allocated among multiple rental properties based on an allocation schedule. For example, rental property investment calculator (104) may be further configured to analyze investments in these multiple rental properties for optimizing a total return on the investment capital.

In one or more embodiments of the invention, investment parameter may further include economy information such as an inflation rate estimate such that rental property investment may be analyzed on a net present value basis.

In one or more embodiments of the invention, rental property investment calculator (104) may be further configured to receive a fee from the investor as payment to the provider of the rental property investment calculator (104). In one or more embodiments of the invention, rental property investment calculator (104) may be further configured to pay a fee to the information sources (102a-102n) on behalf of the provider of the rental property investment calculator (104).

In one or more embodiments of the invention, the repository (108) may be centralized, distributed, or in other appropriate configurations and may include any types of memory or storage device for storing various shift schedules, employee data, message library, etc. as described above.

Figure 2:
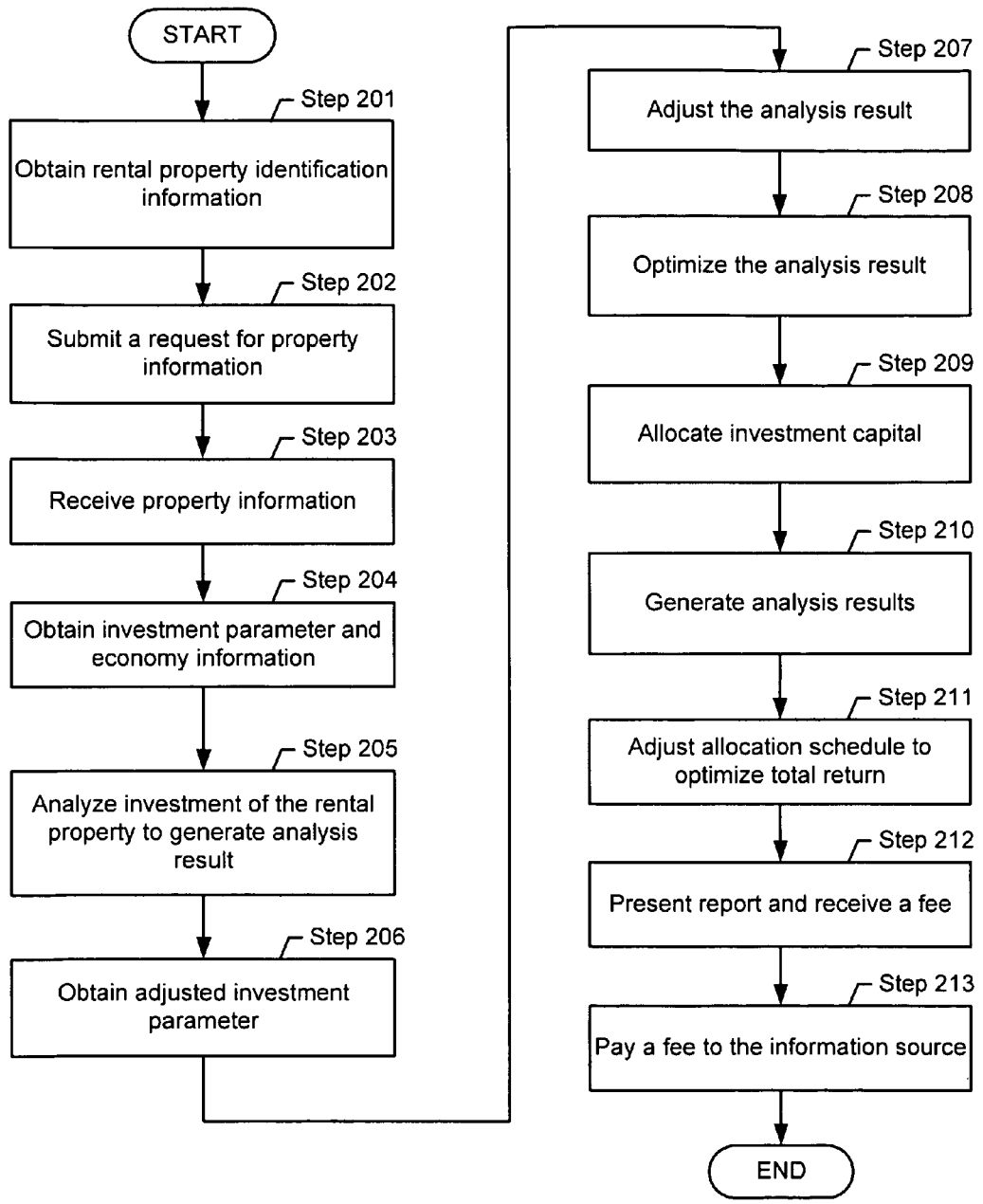
FIGS. 2 and 3 depict a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

In one or more embodiments of the invention, the method depicted in FIG. 2 may be practiced using system (100) described with respect to FIG. 1 above.

Initially, rental property identification information may be obtained, for example by a rental property investment calculator (e.g., (104)) from an investor considering making an investment in the rental property (Step 201). In one or more embodiments of the invention, the rental property identification information may be used to identify the rental property to an information source for requesting property information. In one or more embodiments of the invention, the rental property identification information may be property address, recording map reference designator, or other conventional identification information of the rental property.

In Step 202, a request may be submitted to the informational source based on the rental property identification information. In one or more embodiments of the invention, the request may be submitted electronically via computer networks connecting the rental property investment calculator and the information source. In one or more embodiments of the invention, the request may be submitted based on user (or investor) request. In one or more embodiments of the invention, the request may be submitted automatically on periodic basis, for example as configured by the user (or investor).

In Step 203, property information may be received from the information source responsive to the request submitted in Step 202. In one or more embodiments of the invention, the property information may be received electronically via computer networks connecting the rental property investment calculator and the information source. For example, purchase price history may be obtained from real estate listing service (e.g., multiple listing service) or government organization (e.g., county recorder). Current or past rent information as well as typical vacancy statistics for local properties may be obtained from real estate listing service (e.g., rental listing service, newspaper, etc.), real estate real estate association, rental property management association, or rental property owner association. Information regarding limitations on rent adjustment may be obtained from rental property management association, real estate legal service, or government organization. Furthermore, any of such property information may also be obtained from third party information aggregation service.

In Step 204, investment parameter and economy information may be obtained, for example by the rental property investment calculator from the investor. In one or more embodiments of the invention, investment parameter may include offering price, down payment, mortgage amount, interest rate, interest rate adjustment period, amortization period, personal tax bracket, income deduction summary, rental property active/passive management status, etc. In one or more embodiments of the invention, economy information may include an inflation rate estimate for analyzing rental property investment on a net present value basis.

In Step 205, investment in the rental property may be analyzed based on property information and investment parameters obtained above to generate analysis result. In one or more embodiments of the invention, analysis result may include investment performance measure in capitalization rate, return on investment, return on asset, return on equity, return on capital, and/or other conventional investment performance measures. Generally speaking, conventional methods of calculating these various rental property investment performance measures may be used.

In Step 206, adjusted investment parameters may be obtained. For example, interest rate may be adjusted and a maximum mortgage amount (e.g., based on a maximum LTV ratio) may be imposed by a lender of the mortgage based on investment performance. In addition, the investor may adjust the offering price or the amount of down payment based on the initial investment performance. Accordingly, the analysis result may be adjusted based on the adjusted investment parameters to update the investment performance measure (Step 207). Furthermore, the investment performance may be optimized by adjusting the investment parameter (Step 208). In one or more embodiments of the invention, the investment parameter may be iteratively adjusted by the investor to evaluate potential investment strategies for achieving optimum investment performance. In one or more embodiments of the invention, the investment parameter may be adjusted automatically based on a pre-determined algorithm to optimize the investment performance.

In Step 209, an investment capital be allocated among multiple rental properties based on an allocation schedule. In one or more embodiments of the invention, investments in these multiple rental properties may be analyzed based on respective property information and investment parameters to generate respective analysis results (e.g., respective capitalization rate, respective return on investment, respective return on asset, respective return on equity, respective return on capital, and/or other conventional respective investment performance measures) (Step 210). In one or more embodiments of the invention, the allocation schedule may be adjusted to optimize a total return of the investment capital (Step 211). In one or more embodiments of the invention, the allocation schedule may be iteratively adjusted by the investor to evaluate potential investment strategies for achieving optimum the total return of the investment capital. In one or more embodiments of the invention, the allocation schedule may be adjusted automatically based on a pre-determined algorithm to optimize the total return of the investment capital.

In Step 212, a report may be presented to the investor and a fee may be received (e.g., by the provider of the rental property investment calculator) from the investor. In one or more embodiments of the invention, the report may include analysis results of one or more rental properties for evaluation and/or comparison by the investor. In one or more embodiments of the invention, the analysis results of the one or more rental properties may be presented with respect to an allocation schedule of an investment capital for evaluation and/or comparison by the investor. The report may be presented in electronic form, as a hard copy, or any other readable format. Furthermore, the report may be in a standard format or a format configured by the investor.

In Step 213, a fee may be paid to the information sources for obtaining respective property information. For example, the fee may be paid for each request or on a subscription bases to a real estate listing service or a third party rental information aggregation service by the investor or the provider of the rental property investment calculator.

Figure 3:
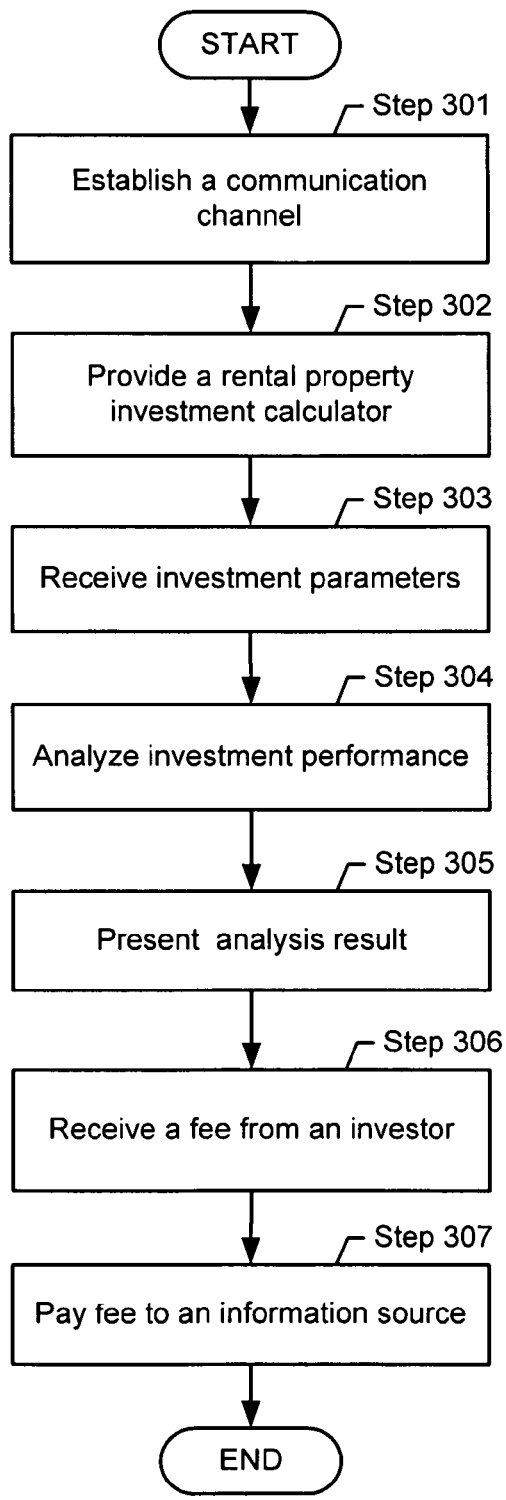

FIG. 3 depicts a flowchart of a method in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangements of steps shown in FIG. 3.

In one or more embodiments of the invention, the method depicted in FIG. 3 may be practiced using system (100) described with respect to FIG. 1 above.

Initially, a communication channel is established with an information source for requesting and receiving rental property information, for example based on a first agreement (Step 301). The information source may include real estate association, real estate listing service, rental property management association, rental property owner association, real estate legal service, government organization, and third party information aggregation service. The rental property information may include purchase price, rent, vacancy rate, rental expense, property tax, rent control rule, etc. which may include historical data of the rental property, historical data of local comparable properties, and current market data of the local comparable properties. In one or more embodiments of the invention, the communication channel may be established based on Internet, e-mail, modem, microwave signal, dial-up electronic connections, satellite communications links, or other electronic communication channels or computer networks. In one or more embodiments of the invention, the first agreement may relate to an interface and periodic updates to the communication channel and fee based access privileges.

In Step 302, a rental property investment calculator is provided, for example to an investor based on a second agreement. In one or more embodiments of the invention, the rental property investment calculator may be integrated in a financial application (e.g., financial management software, accounting software, etc.) used by the investor. In one example, the financial application may be hosted by an application service provider where the rental property investment calculator may be an added feature. In another example, the financial application may be a stand alone application executing on a computing device such as computer, PDA, smart phone, etc. used by the investor. In one or more embodiments of the invention, the rental property investment calculator may be integrated in a third party application such as real estate service provider, information aggregating website, etc. In one or more embodiments of the invention, the rental property investment calculator may be configured to analyze rental property investment performance based on rental property information received from the information source described above and investment parameters of the investor. In one or more embodiments of the invention, the second agreement may relate to fee based usage of the rental property investment calculator.

In Step 303, investment parameters may be received from the investor for analyzing a contemplated investment in a rental property. For example, the investment parameters may include offering price, down payment, mortgage amount, interest rate, interest rate adjustment period, amortization period, personal tax bracket, income deduction summary, rental property active/passive management status, etc.

In Step 304, investment performance may be analyzed using the rental property investment calculator based on property information of the rental property and the investment parameters received from the investor. For example, the rental property information may be requested and received from the information source using the rental property investment calculator. In one or more embodiments of the invention, the investment performance may be measured by capitalization rate, return on investment, return on asset, return on equity, return on capital, and/or other conventional investment performance measures, which may be presented to the investor (Step 305).

In Step 306, a fee may be received from the investor for performing the investment analysis and providing the analysis result according to the second agreement. For example, the fee may be received each time the investment analysis is performed or received on a subscription basis.

In Step 307, a fee may be paid to the information source for requesting and receiving property information according to the first agreement. In one or more embodiments of the invention, the fee may be paid by the investor directly in conjunction with requesting and receiving the rental property information. In one or more embodiments of the invention, the fee may be paid by a provider of the rental property investment calculator to allow the investor free access to the information source. For example, the fee may be paid each time the property information is requested and received or paid on a subscription basis.

Figure 4:
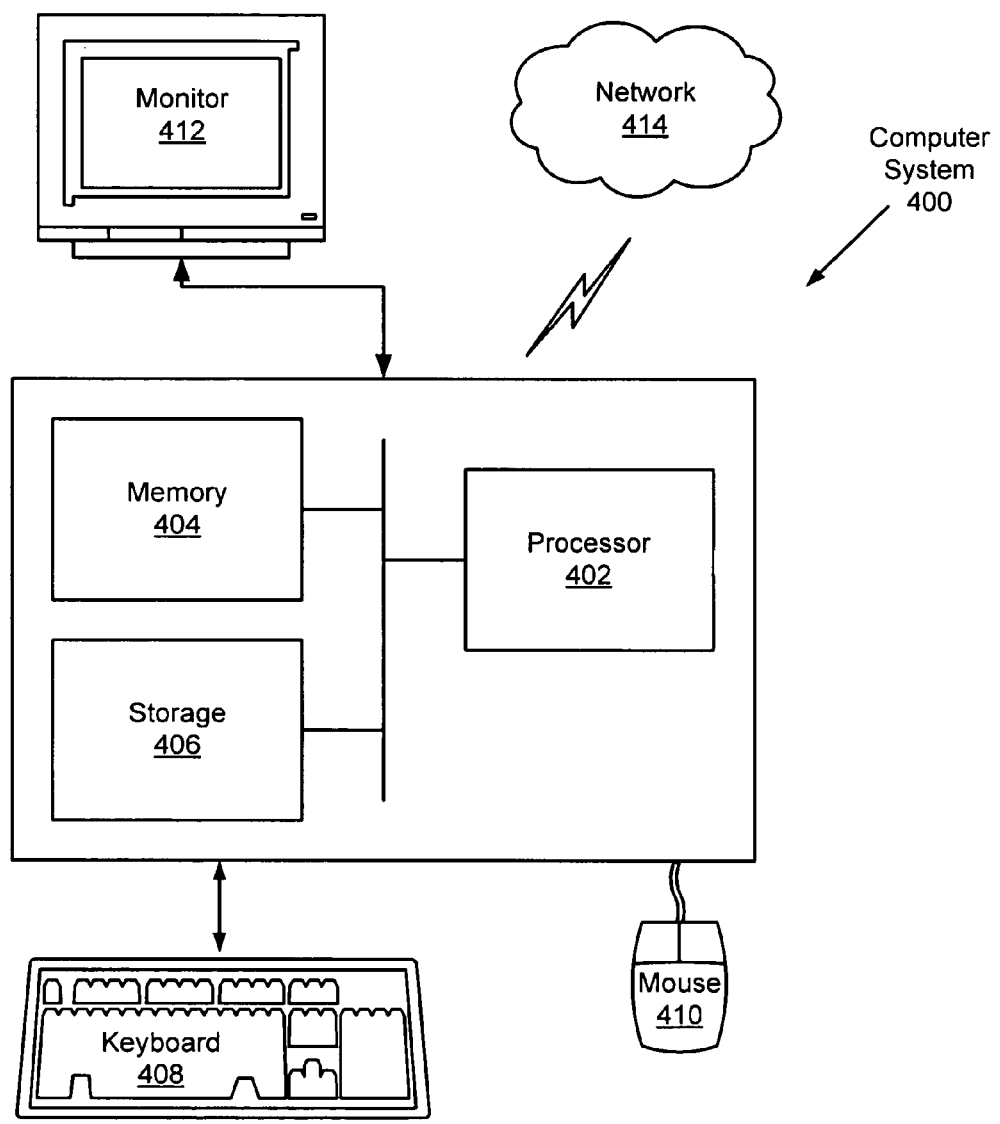
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing an investment in a rental property, comprising:
    obtaining identification information of the rental property, wherein the identification information identifies the rental property to a real estate listing service and a government organization;
    submitting, by a processor of a computer system, a first request to the real estate listing service based on the identification information;
    receiving, by the processor, first property information comprising historical rent data of local comparable properties, current market rent data of the local comparable properties, and purchase price history from the real estate listing service based on the first request;
    submitting, by the processor, a second request to the government organization based on the identification information;
    receiving, by the processor, second property information comprising property tax and a rent control rule of the rental property from the government organization based on the second request;
    obtaining investment parameters comprising down payment amount, mortgage information, and an inflation rate estimate from an investor of the investment in the rental property;
    analyzing, by the processor and prior to making the investment, the investment in the rental property based on the investment parameters, the first property information, and the second property information to generate an analysis result, wherein the investment is analyzed on a net present value basis using the inflation rate estimate;
    adjusting, by the processor and prior to making the investment, the down payment amount, the mortgage information, and the inflation rate estimate to optimize the analysis result, resulting in an optimized analysis result; and
    generating, by the processor, a report based on the optimized analysis result.

2. The method of claim 1, wherein the identification information comprises an address and a type of the rental property.

3. The method of claim 1, wherein the analysis result comprises at least one selected from a group consisting of capitalization rate, return on investment, return on asset, return on equity, and return on capital.

4. The method of claim 1, further comprising:
    allocating an investment capital among a plurality of rental properties based on an allocation schedule;

generating a plurality of analysis results of the plurality of rental properties; and optimizing a total return of the investment capital based on the plurality of analysis results by adjusting the allocation schedule.

5. The method of claim 1, further comprising:

providing the report to the investor of the investment in the rental property; and receiving a fee from the investor.

6. The method of claim 1, further comprising:

paying a fee to the real estate listing service.

7. A system for performing operations for analyzing an investment in a rental property, comprising:

an information source; and a processor and memory comprising instructions when executed by the processor comprise functionality to:

obtain identification information of the rental property, wherein the identification information identifies the rental property to a real estate listing service and a government organization;

submit a first request to the real estate listing service based on the identification information;

receive first property information comprising historical rent data of local comparable properties, current market rent data of the local comparable properties, and purchase price history from the real estate listing service based on the first request;

submit a second request to the government organization based on the identification information;

receive second property information comprising property tax and a rent control rule of the rental property from the government organization based on the second request;

obtain investment parameters comprising down payment amount, mortgage information, and an inflation rate estimate from an investor of the investment in the rental property;

analyze, prior to making the investment, the investment in the rental property based on the investment parameters, the first property information, and the second property information to generate an analysis result, wherein the investment is analyzed on a net present value basis using the inflation rate estimate;

adjust, prior to making the investment, the down payment amount, the mortgage information, and the inflation rate estimate to optimize the analysis result, resulting in an optimized analysis result; and generate a report based on the optimized analysis result.

8. The system of claim 7, wherein the identification information comprises an address and a type of the rental property.

9. The system of claim 7, wherein the analysis result comprises at least one selected from a group consisting of capitalization rate, return on investment, return on asset, return on equity, and return on capital.

10. The system of claim 7, memory further comprising instructions when executed by the processor comprising functionality to:

allocate an investment capital among a plurality of rental properties based on an allocation schedule;

generate a plurality of analysis results of the plurality of rental properties; and optimize a total return of the investment capital based on the plurality of analysis results by adjusting the allocation schedule.

11. The system of claim 7, memory further comprising instructions when executed by the processor comprising functionality to:

present the report to the investor of the investment in the rental property; and receive a fee from the investor.

12. The system of claim 7, memory further comprising instructions when executed by the processor comprising functionality to:

pay a fee to the real estate listing service.

* * * * *